July 7, 1959 P. L. WARREN 2,893,156
STERN LINE OUTRIGGER
Filed Oct. 3, 1955
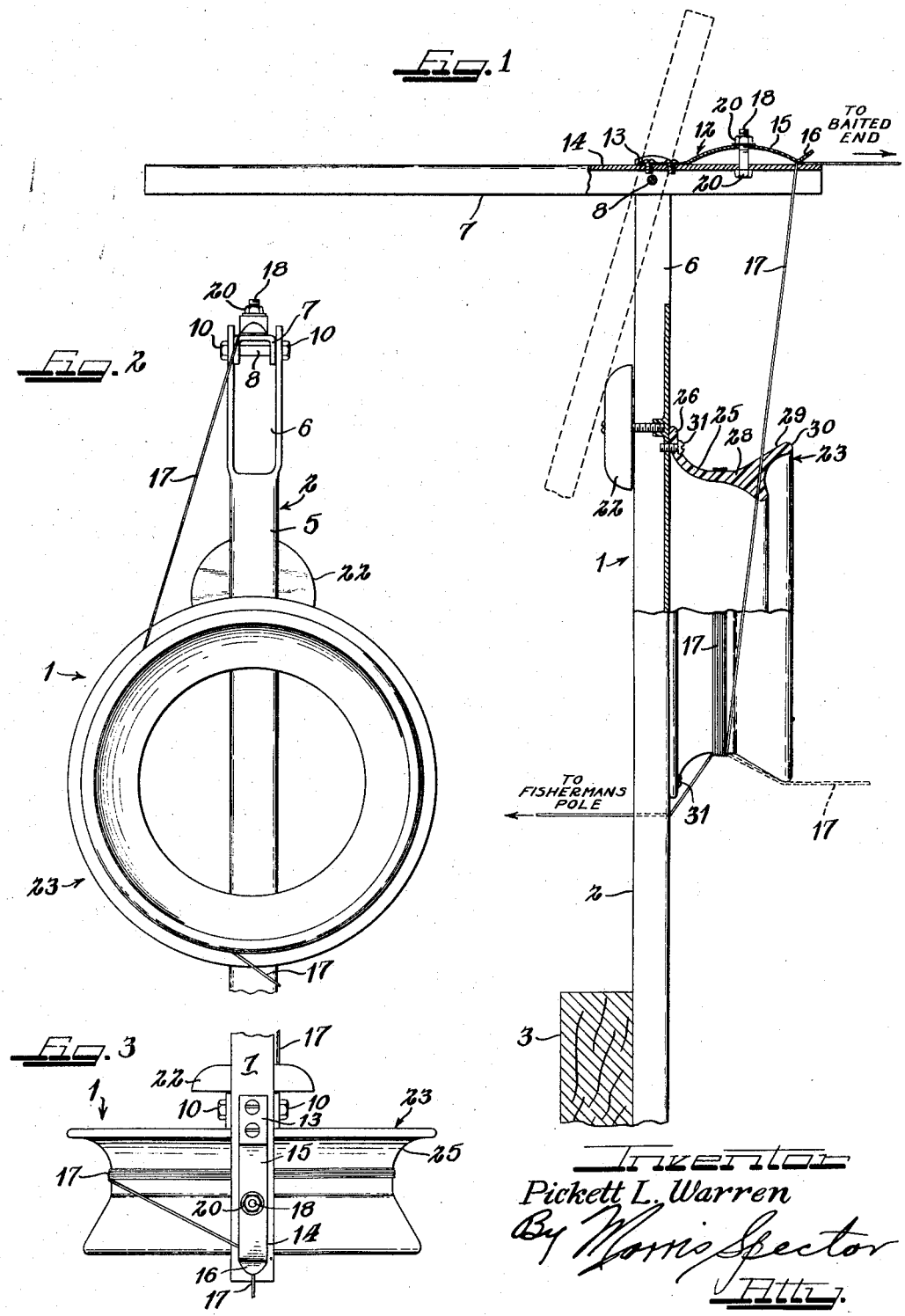
Inventor
Pickett L. Warren
By Morris Spector
Atty.

United States Patent Office 2,893,156
Patented July 7, 1959

2,893,156

STERN LINE OUTRIGGER

Pickett L. Warren, Chicago, Ill.

Application October 3, 1955, Serial No. 538,045

3 Claims. (Cl. 43—17)

This invention relates to fishing apparatus, and more particularly to an outrigger assembly attachable to a boat or the like for releasably supporting a fishing line in place while the baited end thereof is in the water.

In deep sea fishing, particularly sport fishing for tuna, it frequently happens that a fisherman, feeling the pull of a tuna on his line, jerks the line back before the tuna has had a chance to swallow the bait. In such case the fisherman pulls the bait away from the tuna and thus loses his fish.

Accordingly, it is one of the objects of this invention to provide fishing gear for use in tuna fishing or the like which automatically informs the fisherman when he is to pull back on the line. It is another one of the objects of this invention to provide fishing gear which delays the transmission of the fish's tug on the line until the proper instant has arrived for setting the hook and thus avoid to a large measure the difficulty above mentioned.

It is another one of the objects of this invention to provide fishing gear as above described which includes means for sounding a visual and/or an audible alarm when the fish has made its initial pull or tug on the line so that the fisherman may have time to prepare himself mentally and physically for the catch.

It is still another one of the objects of this invention to provide an integral assembly which includes means for accomplishing any one or all of the above objects, and which is relatively inexpensive to construct, light in weight and compact.

These and other objects, advantages and features of the invention will become apparent upon making reference to the description to follow and the drawings disclosing a preferred embodiment of the invention.

In the drawings:

Figure 1 is a view, in partial longitudinal section, of a stern line outrigger incorporating features of the invention. The solid lines represent the position of the parts of the outrigger before a fish has pulled on the line and the dotted lines indicate the position of a part thereof an instant after a fish has tugged on the line;

Figure 2 is a front view of the outrigger as viewed from a point behind the stern of the boat; and Figure 3 is a top view of the outrigger.

Reference should now be made to the drawings where the same reference characters indicate the same elements throughout.

The fishing line outrigger 1 incorporating features of the invention includes a channel-shaped upright 2, the bottom end of which is anchored to the stern 3 of a fishing boat. The top of the web 5 is cut away to provide an opening 6 in which is pivotably supported a channel-shaped bar 7. The bar 7 pivots upon the shank of a headless screw 8 which passes through holes in the flanges of the bar 7 located a short distance from the front end thereof. The screw 8 is held in place on the bar 7 by nuts 10—10 threading over the ends of the screw 8 on the outside of the bar flanges. The portion of the bar behind the pivot screw 8 occupies most of the bar length and is heavier than the front portion thereof. Consequently, the bar under its own weight tends to assume the position shown by the dotted lines in Figure 1.

At the frone end of the bar is a spring metal finger 12 which has a rear flat end 13 fastened to the outer side of the bar web 14, a bowed intermediate portion 15 and a short upturned front clamping lip 16 which bears against the web of the bar. The lip forms a means for clamping a fishing line 17 against the bar 7. An adjusting screw 18 passes through the bowed portion 15 of the spring metal finger 12 and the bar web and the screw is held in place by nuts 20—20 threading respectively over the projecting ends of the screw. By tightening or loosing the uppermost nut 20 which bears upon the bowed portion of the spring metal finger, the pressure of the lip 16 of the finger against the bar 7 is varied. The force necessary to pull the fishing line 17 from between the lip 16 and the bar 7 is thus varied.

A bell 22 is mounted upon the rear of the upright 2. The bell is sounded when the bar is allowed to drop from a horizontal position and actuate the bell.

A ring or pulley 23 is rigidly secured to the front face of the web of the upright 2 with the open portion thereof facing away from the boat and toward the baited end of the fishing line. The ring or pulley has a peripheral groove 25 for receiving windings 26 of the fishing line 17. The groove is defined by a sharply flaring annular rear wall 26 which merges with an intermediate wall 28, and a front annular wall 29 which angles outwardly from the wall 28 at about a 45 degree angle and terminates in a rounded edge 30. The ring is anchored in place by screws 31—31 passing through the rear annular ring wall 26 and threading into the web of the upright 2.

The outrigger 1 of the invention is used as follows:

A desired length of fishing line is unreeled from the reel (not shown) of the fisherman's rod. The line extends from the rod to the ring 23, about which it is then wound the desired number of times, say, seven or eight (assuming that the ring is six inches in diameter) and then is passed under the clamping lip 16 which holds the line against the top of the bar 7, and from there the line extends freely to the fishing hook at the end thereof which is in the river, lake or ocean. The clamping force of the lip is adjusted so that the line will be pulled from under the clamping lip 16 when the line is pulled with a predetermined force to be applied by the fish to be caught. The drag on the baited end of the line holds the pivoted bar 7 into the horizontal position shown in Figure 1.

When a fish takes the bait, the pull on the line becomes sufficient to draw the line from under the clamping lip 16. The bar 7 then pivots to its upright position under the weight of the heavier rear end portion thereof. The latter strikes the bell 22 and sounds an alert to the fisherman. The line is then in the position shown in dotted lines in Figure 1 and is free to unwind from the ring 23. The inclined front annular wall 29 of the ring enables the line to unwind freely from the ring as the line is pulled by the fish. When the line is completely unwound from the ring 23, then and then only does the fisherman feel the pull on the line. The line is then completely free of the outrigger.

The outrigger above described is highly effective in catching many forms of deep sea fish, particularly tuna. Further, it is sturdy, compact and inexpensive to construct.

It should be understood that numerous modifications may be made of the preferred embodiment of the invention above described without deviating from the broader aspect of the invention.

What is claimed is:

1. A fishing line outrigger assembly for holding a fisherman's line between the reel of a fisherman's rod and the end of the line that carries the fish hook, said outrigger assembly comprising a pivoted lever having a normal position and an operative position, pull-responsive line-holding means on said lever and including means for gripping a line by a clamping grip of a magnitude which will enable a pull on the line to actuate the lever to its operative position and will enable the fish's tug on the line to pull the line free of the holding means, means for delaying the transmission of the tug on the line by the fish to the fisherman after the release of the line from said holding means, said delaying means comprising a ring having a peripheral groove formed therein into which a portion of the fishing line behind the portion gripped by said holding means may be wound, the front defining wall of said groove being inclined with respect to the ring axis and having a smooth shape throughout to facilitate the unwinding of said line when the line has been pulled free of said holding means, and means for supporting said ring in position where the axis of said ring faces in the general direction in which the baited end of the fishing line extends, whereby the line will unwind from said ring when the line is released from said holding means and the pull of the fish on the line is not transmitted to the fisherman until the line unwinds from said ring, the portion of the line supported by the delaying means being between the line gripping means and the fisherman's reel and being free of mechanical connection with the outrigger so that when that portion of the line is payed out by the pull of a fish the line comes free of the outrigger.

2. A fishing line outrigger assembly comprising a support member adapted to be anchored in an upright position to a part of a boat, a member pivoted intermediate its ends to said support member, said pivoted member assuming an upright position under its own weight and having holding means associated therewith for clamping a portion of a fishing line in place, means for adjusting the clamping force of said holding means to a point where the pull on the line applied by a fish will pull the line free of the holding means, the normal drag on the line pivoting said pivoted member into a generally horizontal position, and line-support means carried by said support member, and about which a portion of the line located behind the portion clamped by said holding means may be wound, said line being adapted to unwind from said line support means after the line has been released from said holding means and thereby delaying the transmission of the fish's tug on the line to the fisherman.

3. A fishing line outrigger assembly comprising a support member adapted to be anchored in an upright position to a part of a boat, a member pivoted intermediate the ends to the top of said support member, said pivoted member assuming an upright position under its own weight with its front end up and its rear end down, said front end of said pivoted member having a line clamping means mounted thereon for clamping a portion of a fishing line in place, means for adjusting the clamping force of said clamping means to a point where the pull on the line applied by a fish will pull the line free of the clamping means, the normal drag on the line pivoting said pivoted member into a generally horizontal position, audible alerting means actuated by the swinging of said pivoted member into its upright position, and line-support means carried on the front of said support member below the pivot axis of said pivoted member, said line-support means comprising a ring anchored to the front of said support member with its axis extending in the direction of the baited end of the line, said ring having a peripheral groove formed therein into which a portion of the fishing line located behind the portion held by said clamping means may be wound, the front defining walls of said groove being inclined with respect to the ring axis and being smooth to facilitate the unwinding of said line therefrom when the line has been pulled free of said clamping means.

References Cited in the file of this patent

UNITED STATES PATENTS

| | | |
|---|---|---|
| 1,391,002 | Morin | Sept. 20, 1921 |
| 2,087,828 | Wiedemann | July 20, 1937 |
| 2,545,185 | Winslow | Mar. 13, 1951 |
| 2,560,905 | Teel | July 17, 1951 |
| 2,627,689 | Sokolowski | Feb. 10, 1953 |
| 2,627,690 | Kniffer | Feb. 10, 1953 |
| 2,650,448 | Lichtig | Sept. 1, 1953 |
| 2,707,347 | Sneed | May 3, 1955 |
| 2,731,756 | Nelson | Jan. 24, 1956 |